(12) United States Patent
Massot

(10) Patent No.: US 12,524,617 B2
(45) Date of Patent: Jan. 13, 2026

(54) SYSTEM AND METHOD FOR VISUAL REPRESENTATION OF DOCUMENT TOPICS

(71) Applicant: Schlumberger Technology Corporation, Sugar Land, TX (US)

(72) Inventor: Jerome Massot, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 290 days.

(21) Appl. No.: 18/464,446

(22) Filed: Sep. 11, 2023

(65) Prior Publication Data

US 2024/0220728 A1 Jul. 4, 2024

Related U.S. Application Data

(60) Provisional application No. 63/477,411, filed on Dec. 28, 2022.

(51) Int. Cl.
| | | |
|---|---|---|
| *G06F 40/30* | (2020.01) | |
| *G06V 30/19* | (2022.01) | |
| *G06V 30/413* | (2022.01) | |

(52) U.S. Cl.
CPC ........ *G06F 40/30* (2020.01); *G06V 30/19093* (2022.01); *G06V 30/413* (2022.01)

(58) Field of Classification Search
CPC . G06F 40/30; G06V 30/19093; G06V 30/413
See application file for complete search history.

(56) References Cited

U.S. PATENT DOCUMENTS

| | | | | |
|---|---|---|---|---|
| 9,286,668 | B1* | 3/2016 | Angilivelil | G06V 30/414 |
| 10,769,360 | B1* | 9/2020 | Arnold | G06F 40/174 |
| 10,997,405 | B1* | 5/2021 | Lam | G06N 3/084 |
| 11,861,143 | B1* | 1/2024 | Vandivere | G06F 16/93 |
| 2005/0283723 | A1* | 12/2005 | Fish | G06F 40/169 |
| | | | | 715/764 |

(Continued)

FOREIGN PATENT DOCUMENTS

| | | |
|---|---|---|
| KR | 1020190102529 A | 9/2019 |
| KR | 102080910 B1 | 2/2020 |

OTHER PUBLICATIONS

Search Report and Written Opinion of International Patent Application No. PCT/US2023/032372, dated Dec. 28, 2023, 9 Pages.

*Primary Examiner* — Eric Yen
(74) *Attorney, Agent, or Firm* — Jeffrey D. Frantz

(57) ABSTRACT

A document analysis and processing (DAP) system is disclosed that includes at least one memory configured to store a corpus of documents and a topic classifier having a first trained artificial intelligence (AI) model and at least one processor configured to execute stored instructions to perform actions. The actions include, for each document of the corpus of documents: using the first trained AI model of the topic classifier to identify topics of each page of the document; mapping each of the identified topics of each page of the document to respective topic colors; combining the respective topic colors of each page of the document to yield a respective page color code for each page of the document; and combining the respective page color code of each page of the document to yield a respective document color code of the document.

20 Claims, 10 Drawing Sheets

(56) References Cited

U.S. PATENT DOCUMENTS

| | | | |
|---|---|---|---|
| 2014/0337723 A1* | 11/2014 | Van Tol | G06Q 30/0601 |
| | | | 715/275 |
| 2015/0138399 A1* | 5/2015 | Ma | G06Q 20/047 |
| | | | 348/239 |
| 2015/0154290 A1* | 6/2015 | Allen | G06F 40/169 |
| | | | 707/725 |
| 2015/0269433 A1* | 9/2015 | Amtrup | H04N 1/00106 |
| | | | 382/115 |
| 2016/0335345 A1 | 11/2016 | Wang | |
| 2017/0140117 A1 | 5/2017 | Haddad et al. | |
| 2019/0332666 A1 | 10/2019 | Dadachev et al. | |
| 2020/0151591 A1* | 5/2020 | Li | G06N 3/08 |
| 2020/0394396 A1* | 12/2020 | Yanamandra | G06V 30/413 |
| 2022/0189472 A1* | 6/2022 | Jepperson | G06F 3/167 |
| 2023/0325582 A1* | 10/2023 | Shapiro | G06F 40/205 |
| | | | 715/234 |
| 2025/0061277 A1* | 2/2025 | Zhu | G06F 40/284 |

* cited by examiner

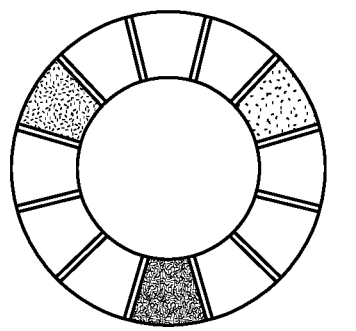
SECONDARY
ORANGE
VIOLET
GREEN
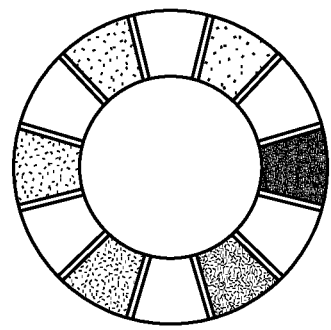
TERTIARY
YELLOW ORANGE
RED ORANGE
RED VIOLET
BLUE VIOLET
BLUE GREEN
YELLOW GREEN
FIG. 3

SYSTEM AND METHOD FOR VISUAL REPRESENTATION OF DOCUMENT TOPICS

CROSS-REFERENCE TO RELATED APPLICATION

This application claims priority to and the benefit of U.S. Provisional Patent Application Ser. No. 63/477,411, entitled "SYSTEM AND METHOD FOR VISUAL REPRESENTATION OF DOCUMENT TOPICS," filed Dec. 28, 2022, which is hereby incorporated by reference in its entirety for all purposes.

BACKGROUND

The present disclosure relates generally to document topic analysis and similarity searching and, more specifically, to techniques for visually representing the topics of a corpus of documents and enabling comparisons and similarity searching within the corpus of documents.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern companies often produce and manage a large number of documents. For example, a company may produce reports (e.g., sales reports, inspection reports), knowledge articles, promotional materials, user manuals, and so forth. Each of these documents may include details or discussion related to one or more topics. However, since the number of documents produced and managed by the company may be enormous, it can be difficult for a user to navigate the corpus of documents and identify topics of interest. Further, it can also be challenging for a user to find similar or related documents within the large corpus of documents. This can lead to inefficiencies and additional operational costs as users can spend inordinate amounts of time searching and reviewing documents in an attempt to locate particular topics and/or related documents in the large corpus.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a document analysis and processing (DAP) system includes at least one memory configured to store a corpus of documents and a topic classifier having a first trained artificial intelligence (AI) model and at least one processor configured to execute stored instructions to perform actions. The actions include, for each document of the corpus of documents: using the first trained AI model of the topic classifier to identify topics of each page of the document; mapping each of the identified topics of each page of the document to respective topic colors; combining the respective topic colors of each page of the document to yield a respective page color code for each page of the document; and combining the respective page color code of each page of the document to yield a respective document color code of the document.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a diagram illustrating an embodiment of a color coding scheme that may be used by the topic classifier when mapping identified topics of a page of a document to topic colors, in accordance with embodiments of the present technique;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted, a company may generate and manage a large quantity of documents, and it may be difficult for a user to locate documents that are related to particular topics or to find documents that are similar to another document. With this in mind, present embodiments are directed to a document analysis and processing (DAP) system that enables the generation of document color codes for each document, wherein each document color code is an image that provides a latent, compressed, colored visual representation of the topical and/or technical information contained within each document. The disclosed document color codes enable improved document comparison and similarity clustering of document, as these document color codes represent densified or distilled document information for more rapid visual and/or image analysis. Additionally, the disclosed document color codes enable the use of pre-trained image similarity search engines, such as GOOGLE Image Search, which reduces implementation cost and effort. In some embodiments, documents may be modified to include color coding to indicate the topics discussed within each page, which can aid a user in quickly locating portions of interest in a document, reducing the time consumed by, as well as the effort, of the user.

Figure 1:
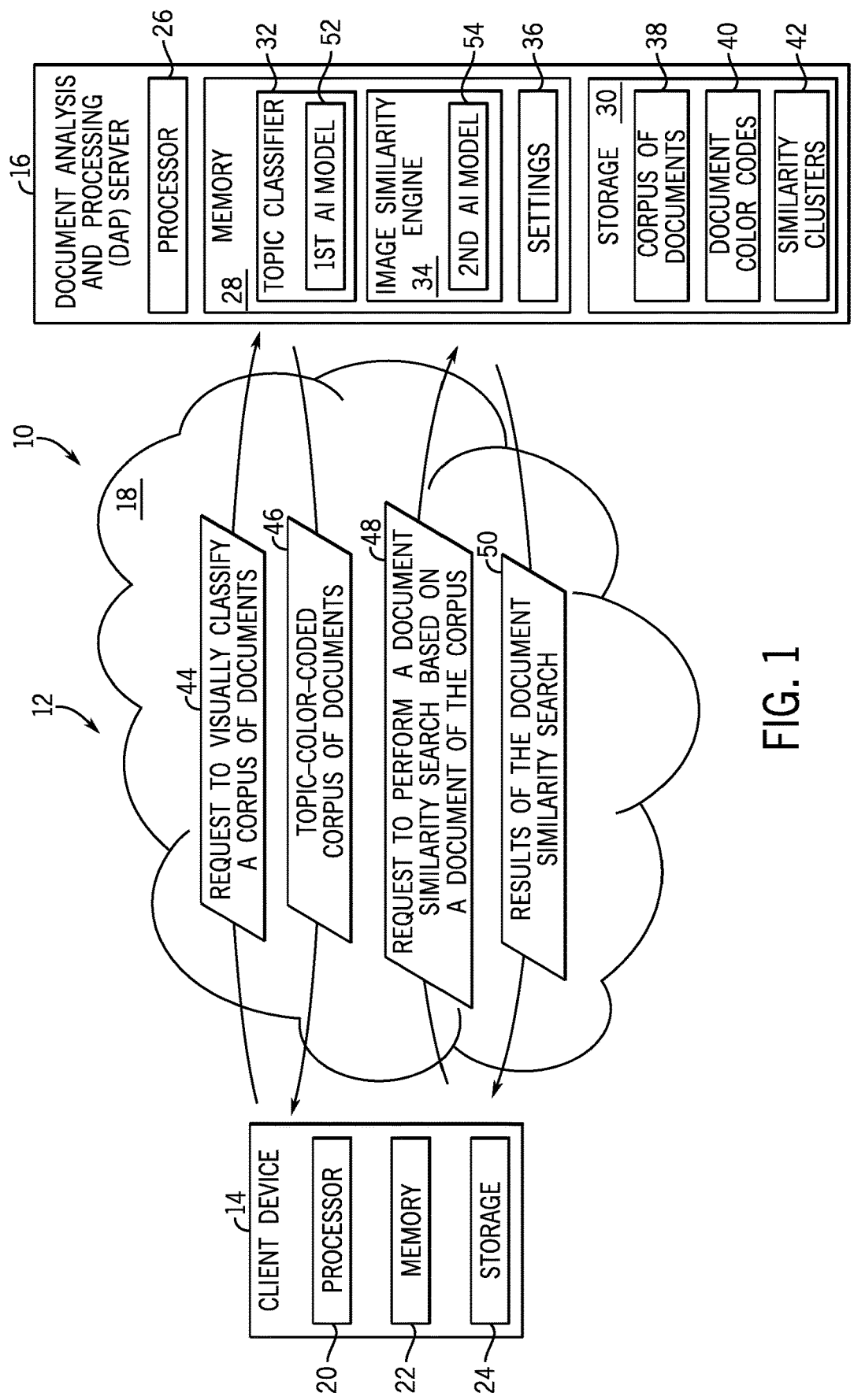
FIG. 1 is a schematic of a document analysis and processing (DAP) system implemented in a client-server architecture, in accordance with embodiments of the present technique.

With the foregoing in mind, FIG. 1 is a schematic of a document analysis and processing (DAP) system 10 implemented in a client-server architecture 12. For the illustrated embodiment, the DAP system 10 includes a client device 14 that is communicatively coupled to a document analysis and processing (DAP) server 16 via a suitable network 18 (e.g., a local area network, a wide area network, a virtual private network, the internet). While the illustrated DAP system 10 is implemented in a client-server architecture 12, in other embodiments, the DAP system 10 may be implemented within a cloud-based architecture, or within a single (e.g., local, stand-alone) computing system.

For the embodiment illustrated in FIG. 1, the client device 14 includes at least one processor 20 (e.g., processing circuitry, a central processing unit (CPU), a graphics processing unit (GPU)), at least one memory 22 (e.g., random access memory (RAM), read-only memory (ROM), non-transitory computer-readable media), and at least one storage 24 (e.g., solid state disk, hard drive, flash drive). The memory 22 and/or storage 24 of the client device 14 stores instructions that are executed by the processor 20 to enable the client device 14 to perform desired functions, including providing requests to the DAP server 16, and receiving responses from the DAP server 16, via the network 18. For example, in some embodiments, the client device 14 may store and execute an internet browser to enable the user to interact with the DAP server 16.

Similarly, the DAP server 16 includes at least one processor 26 (e.g., processing circuitry, a CPU, a GPU), at least one memory 28 (e.g., RAM, ROM, non-transitory computer-readable media), and at least one storage 30 (e.g., solid state disk, hard drive, flash drive). The memory 28 and/or storage 30 of the DAP server 16 stores instructions that are executed by the processor 26 to enable the DAP server 16 to perform the methods described below. In particular, the memory 28 or storage 30 of the DAP server 16 stores a topic classifier 32 that is designed and implemented to identify topics within a corpus of documents, and configured to determine a respective document color code based on the identified topics to visually represent each of the documents of the corpus. As used herein, a "corpus" refers to a collection of documents, which may be implemented, for example, as a set of document files or a repository (e.g., database) of documents. The memory 28 or storage 30 of the DAP server 16 also stores an image similarity engine 34 that is designed and implemented to group documents into similarity clusters based on the respective document color code of each document of the corpus. The memory 28 of the DAP server 16 also stores settings 36 that are configured by a user or designer and are used by the topic classifier 32 and/or the image similarity engine 34 during operation, as discussed below. The storage 30 or the memory 28 of the DAP server 16 stores the corpus 38 of documents, the document color codes 40 determined by the topic classifier 32 for the documents of the corpus 38, and the similarity clusters 42 determined by the image similarity engine 34 for the documents of the corpus 38.

For the embodiment illustrated in FIG. 1, the DAP server 16 may receive a request 44 (e.g., from the client device 14) to visually classify a corpus of documents. In some embodiments, the request 44 may include the corpus 38 of documents, which may be stored within the storage 30 of the DAP server 16. As discussed below, the DAP server 16 may respond by performing a visual topic classification process, as discussed below with respect to FIG. 2, to transform the corpus 38 of documents into a topic-color-coded corpus 46 of documents, in which each page of each document includes a page color code that visually represents the topics of the page. As such, the user of the client device 14 may be able to more easily traverse the documents of the topic-color-coded corpus 46, focusing attention on one or more pages or documents that correspond to particular topics of interest. In some embodiments, the topic-color-coded corpus 46 of documents may be returned to the client device 14 in response to the request 44. In some embodiments, the respective document color code determined for each document of the corpus may additionally or alternatively be provided in response to the request 44. The DAP server 16 additionally perform a similarity clustering process, as discussed below with respect to FIG. 7, to group the documents of the corpus 38 into the similarity clusters 42, as discussed below.

At some point after visually classifying and performing similarity clustering of the corpus 38 of documents, for the embodiment illustrated in FIG. 1, the DAP server 16 may receive a request 48 (e.g., from the client device 14) to perform a similarity search based on a particular document, such as a particular document of the corpus 38 or a new document that is not contained within the corpus 38. For example, the request 48 may include the particular document or a previously determined document color code of the particular document. In response, the DAP server 16 may perform a similarity search process, as discussed below with respect to FIGS. 9 and 10, to determine one or more documents of the corpus 38 that belong in at least one common similarity cluster with the particular document, or to find one or more documents of the corpus 38 having a sufficiently high similarity score with the particular document. The DAP server 16 may return the results 50 of the similarity search, for example, as a set of documents organized by similarity cluster or similarity score.

As noted above, the topic classifier 32 is designed and implemented to identify topics within the documents of the corpus 38, and to determine a respective document color code based on the identified topics to visually represent each of the documents of the corpus. More specifically, the topic classifier 32 may include a first artificial intelligence (AI) model 52 (e.g., a neural network model) that is trained and/or fine-tuned to receive text from a page of a document as input, and to provide, as output, one or more identified topics discussed within the text, along with corresponding relative weighting scores and confidence scores for each identified topic. In certain embodiments, the possible topics to be identified are relevant to a particular domain (e.g., a technology or business space) associated with a client, and these may be defined by a user or designer and stored within the settings 36 of the DAP server 16. For example, for an oil and gas client, possible topics that can be identified may include, but are not limited to: petrophysics, dynamic performance, past exploration history, fluid drilling history, past production history, chemistry, storage capacity, deployment planning, and contract/legal discussions. In some embodiments, the AI model 52 of the topic classifier 32 may include a drop-out layer having a respective node for each of the topics defined in the settings 36 for a given client. During training, the AI model 52 may be provided with a labeled training data set, which includes pages of text of documents, wherein each page is labeled by a human user or designer to indicate the topics that should be identified by the AI model 52 for each page. One or more weights of the AI model 52 are iterative adjusted until the AI model 52 correctly identifies topics in the documents of the training data set. In some embodiments, the AI model 52 may be configured to identify no more than three topics per page of a document, or to identify the three most prevalent topics per page of a document. Additionally, as discussed below, the topic classifier 32 also includes computer-implemented instructions for mapping the identified topics of each page to particular topic colors, for blending the topic colors of each page to determine a page color code of each page of a document, and for combining and normalizing the page color code of each page of the document to determine a document color code that visual represents the document.

As noted above, the image similarity engine 34 is designed and implemented to group documents of the corpus 38 into the similarity clusters 42 based on the respective document color code of each document. As such, the image similarity engine 34 includes a second AI model 54 (e.g., a second neural network) that is trained and/or fine-tuned to determine similarity scores for documents of the corpus 38. For example, in an embodiment, the AI model 54 of the image similarity engine 34 may be trained and/or fine-tuned to receive, as input, a pair of document color codes representing two documents of the corpus 38, and to provide, as output, a similarity score with respect to the two documents. In some embodiments, the AI model 54 of the image similarity engine 34 may be trained and/or fine-tuned to receive, as input, a pair of document color codes representing two documents of the corpus 38 and a similarity feature to be considered, and to provide, as output, a similarity score with respect to the two documents and the similarity feature. In some embodiments, a set of possible similarity clusters types (e.g., inspection reports, business reports, knowledge articles, oil and gas production facility reports) is defined within the settings 36 of the DAP server 16, as well as an architype dataset that includes a respective architype document color code representing each similarity cluster type, wherein the architype document color codes may be determined as discussed above with respect to model or architype documents for each of the similarity cluster types. For such embodiments, the AI model 54 may be configured to receive, as input, a document color code representing a document, and to provide, as output, a set of similarity scores indicating a similarity between the document color code of the document and the document color codes of each of the architype document color codes.

In certain embodiments, the AI model 54 of the image similarity engine 34 may be a pre-trained image analysis model that is fine-tuned to specifically compare document color codes for similarity. During training and/or fine-tuning, the AI model 54 may be provided with a labeled training data set, which includes pairs of document color codes, wherein each pair of document color code is labeled by a human user or designer to indicate the similarity score that should be determined by the AI model 54 for the pair of document color codes. One or more weights of the AI model 54 are iterative adjusted until the AI model 54 correctly determines similarity scores for the documents represented by the pairs of document color codes in the training data set. Additionally, as discussed below, the image similarity engine 34 also includes computer-implemented instructions for suitably grouping or organizing the documents of the corpus 38 into the similarity clusters 42 based on these similarity scores. In some embodiments, the image similarity engine 34 may use information retrieved from the settings 36 during operation, such as similarity features for the document color code comparison and/or threshold values for forming the similarity clusters 42.

Figure 2:
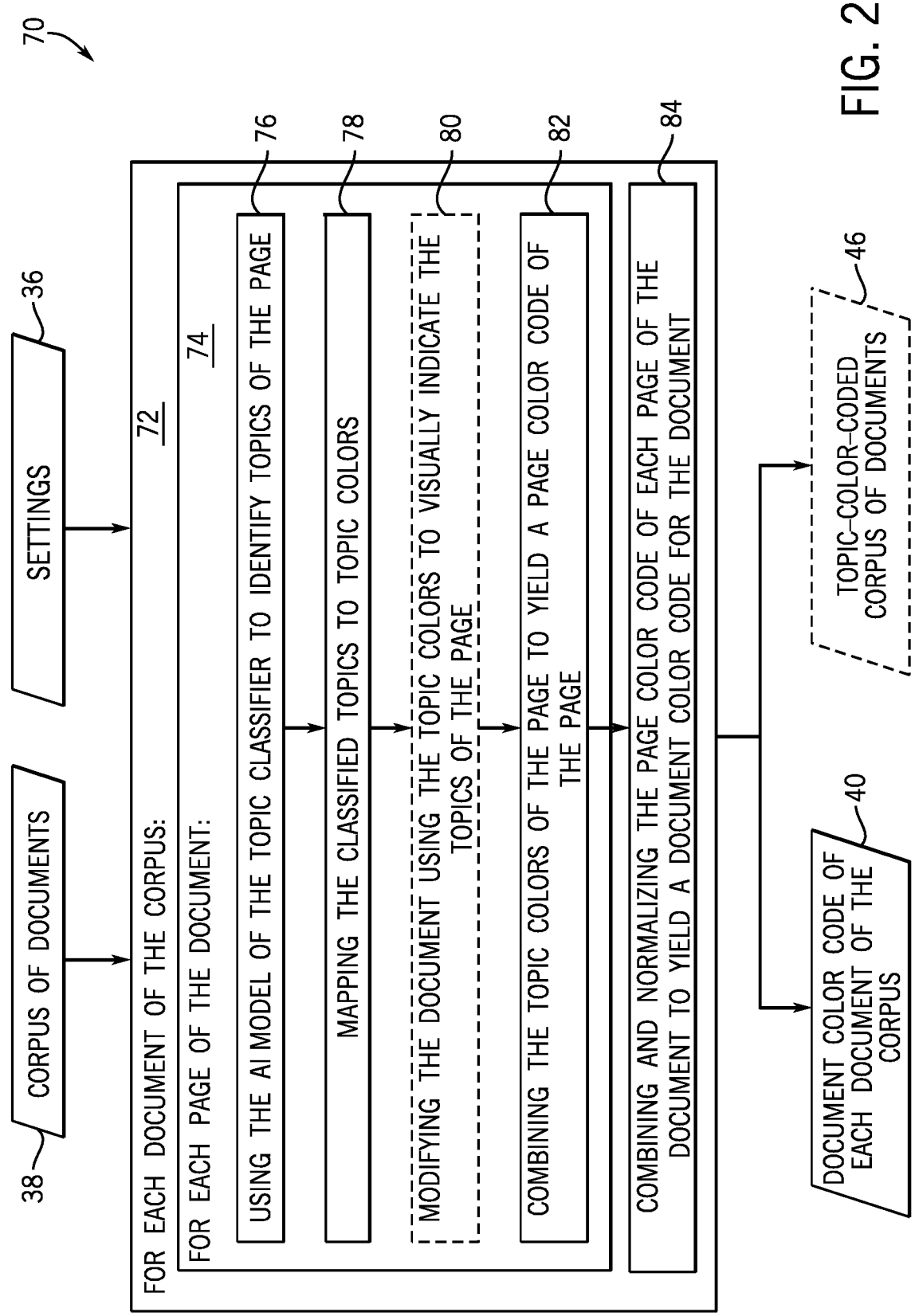
FIG. 2 is a flow diagram illustrating an embodiment of a visual topic classification process whereby a topic classifier of the DAP system analyses documents of a corpus to determine a respective document color code for each document, in accordance with embodiments of the present technique.

FIG. 2 is a flow diagram illustrating an embodiment of a visual topic classification process 70 whereby the topic classifier 32 analyses the documents of the corpus 38 to determine a respective document color code for each document of the corpus 38. The visual topic classification process 70 may be stored as computer-implemented instructions within the memory 28 and executed by the processor 26 of the DAP server 16, as illustrated in FIG. 1. As illustrated in FIG. 2, the corpus 38 is provided as an input to the visual topic classification process 70, and the corpus 38 may be received from a user or from storage 30 of the DAP server 16. The visual topic classification process 70 of FIG. 2 is discussed with reference to elements illustrated in FIG. 1. In certain embodiments, the topics classified by the topic classifier 32 may specially be related to the exploration, production, and processing of oil and gas for oil and gas operations.

For the embodiment illustrated in FIG. 2, the visual topic classification process 70 includes a pair of nested for-loops. The outer for-loop 72 iterates through each document of the corpus 38, while the inner for-loop 74 iterates through each page of the document. Within the inner for-loop 74, visual topic classification process 70 includes the processor 26 using (block 76) the AI model 52 of the topic classifier 32 to identify topics of the page. In some embodiments, the AI model 52 and/or the topic classifier 32 may be configured to determine no more than three prevailing topics per page. The visual topic classification process 70 continues with the processor 26 mapping (block 78) the classified topics to topic colors. In some embodiments, the topic color associated with each topic may be defined within the settings 36 of the DAP system 10. In some embodiments, within the inner for-loop 74, the visual topic classification process 70 includes the processor 26 modifying (block 80) the page of the document using the topic colors to visually indicate the topics of the page. For example, in some embodiments, portions of the text of the page that have been identified as corresponding to the three prevailing topics of the page may be highlighted in the respective topic colors, or the headers of the page may be modified to include colored blocks visually indicating the three prevailing topics of the page. In other embodiments, the actions of block 80 may be skipped.

For the embodiment illustrated in FIG. 2, within the inner for-loop 74, the visual topic classification process 70 includes combining (block 82) the topic colors of the page to yield a page color code of the page. Once the respective page color code has been determined for each page of the document, still within the outer for-loop 72, the processor 26 then combines and normalizes (block 84) the page color code of each page of the document to yield a document color code for the document. Once the processor 26 has determined a respective document color code for each of the documents of the corpus 38, the processor 26 may output or store (e.g., in storage 30) the document color codes 40. For embodiments in which the document is modified in block 80, the processor 26 may additionally or alternatively output or store a topic-color-coded corpus 46 of documents, in which each page of each document of the topic-color-coded corpus 46 has been modified to visually indicate the identified topics.

The visual topic classification process 70 of FIG. 2 may be better understood in light of FIGS. 3-6, which illustrate an example embodiment of a color coding scheme whereby the processor 26 determines the page color code of each page and the document color code of each document of the corpus 38. For this example embodiment, for each topic identified on a page of a document (e.g., in block 76 of FIG. 2), three parameters are determined by the topic classifier 32 and/or the AI model 52: a topic color of the topic, a relative weighting score compared to other topics identified on the same page, and a confidence score provided by the AI model 52 of the topic classifier 32 with respect to the topic being detected. FIG. 3 is a diagram illustrating an embodiment of a color coding scheme that may be used by the topic classifier 32 when mapping identified topics to topic colors (e.g., in block 78 of FIG. 2). For the example illustrated in FIG. 3, the topic colors are limited to the Secondary and Tertiary colors, i.e., 9 colors (orange, violet, green, yellow orange, red orange, red violet, blue violet, blue green, yellow green), each defined within the settings 36 of the DAP server 16 to represent a topic of interest within a particular domain (e.g., oil and gas exploration, production, and/or processing operations).

Figure 4:
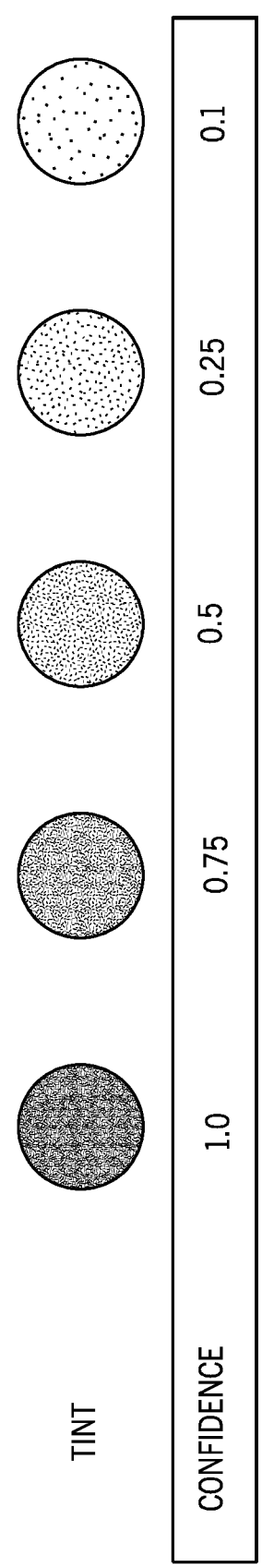
FIG. 4 is a diagram illustrating an embodiment of a tinting scheme associated with the respective confidence scores of topics identified by the topic classifier, in accordance with embodiments of the present technique.

As noted, in some embodiments, only the top three dominant or prevailing topics identified on a page are used to determine the topic colors for the page, as determined by the relative weighting score. For example, the relative weighting score of an identified topic may be determined based on the lengths of the sentences corresponding to this topic or based on the number of topic-specific keywords occurrences found in the page, wherein the weighting scores of all topics identified within the page are normalized as floats summing to unity (e.g., 1). In addition to determining which topic colors will be selected to represent the prevailing topics of a page, the relative weighting score may be used to when combining the topic colors to generate the page color code for the page. Furthermore, in some embodiments, the respective confidence scores associated with each of the prevailing topics of the page may be used to determine a tint of each of the topic colors before blending, as illustrated in the example of FIG. 4. FIG. 4 is a diagram illustrating an embodiment of a tinting scheme associated with the respective confidence scores of topics identified by the topic classifier. The confidence score may be a floating point value ranging between zero (e.g., least confidence) to one (e.g., highest confidence). While the tinting illustrated as discrete or quantized steps in FIG. 4 for simplicity, in some embodiments, the tint may be continuously varied across the entire confidence score range (e.g., between 0 and 1).

Figure 5:
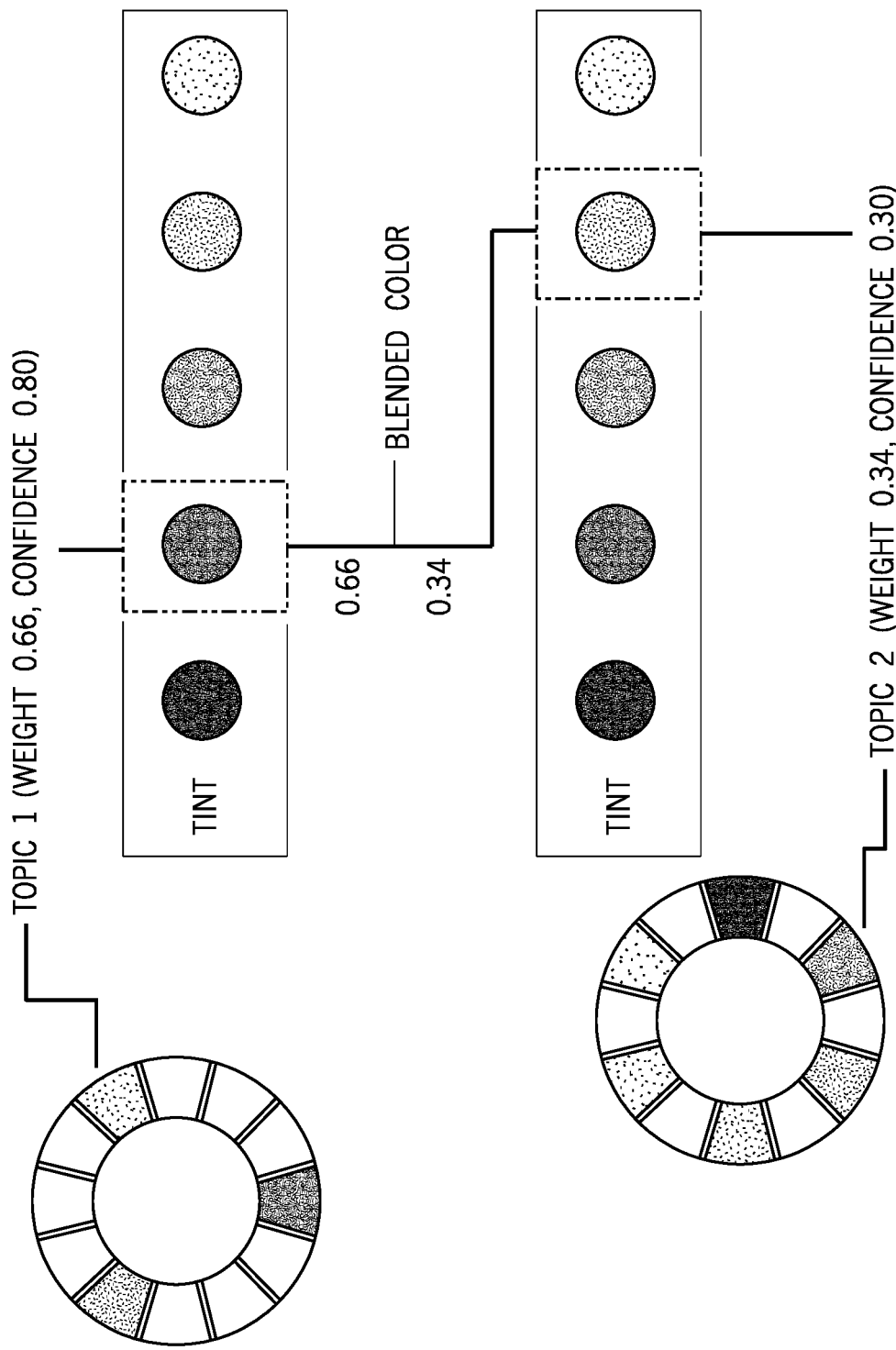
FIG. 5 is a diagram illustrating an example of combining of the topic colors of the identified topics of a page into a page color code, in accordance with embodiments of the present technique.

With the foregoing in mind, in certain embodiments, when the processor 26 combines the topic colors of the prevailing topics of the page (e.g., in block 82 of FIG. 2), the processor 26 may modify and blend the individual topic colors, as illustrated in FIG. 5. FIG. 5 is a diagram illustrating the combining of the topic colors of the prevailing topics of a page into a page color code for an example embodiment. For the example illustrated in FIG. 5, a first prevailing topic (e.g., fluid drilling history) is identified in the page having a relative weighting of 0.66 and a confidence score of 0.8, and a second prevailing topic (e.g., drilling fluid chemistry) is identified in the page having a relative weight of 0.34 and a confidence score of 0.3. As such, for this example page, at block 78 of FIG. 2, the processor may map the first prevailing topic to a first color (e.g., a Secondary color) and map the second prevailing topic to a second color (e.g., a Tertiary color), based on the settings 36 of the DAP system 10.

For the example of FIG. 5, when combining the topic colors of each page to yield the page color code (e.g., at block 82 of FIG. 2), the processor 26 uses the confidence score of the first topic to select an appropriate tint for the first topic color, and uses the confidence score of the second topic to select an appropriate tint for the second topic color. For the illustrated example, the tints add white or black to the base topic color, resulting in a lighter hue for a lower confidence score and a darker hue for a higher confidence score. Additionally, the processor 26 blends the first tinted topic color and the second tinted topic color, wherein each tinted topic color contributes to the overall blended color of the page color code in accordance with the relative weighting score of each topic. For another example, if two prevailing topics are identified with relative weighting scores of 0.75 for the first and 0.25 for the second, the blended color corresponds to 75% of the first tinted topic color and 25% of the second tinted topic color. As such, at the conclusion of block 82 of FIG. 2, the page color code for the page is determined, and this page color code visually depicts the prevailing topics, the relative weight (or volume of discussion) of each of these topics within the page, as well as the confidence of the AI model 52 of the topic classifier 32 in each the identification of each topic.

Figure 6:
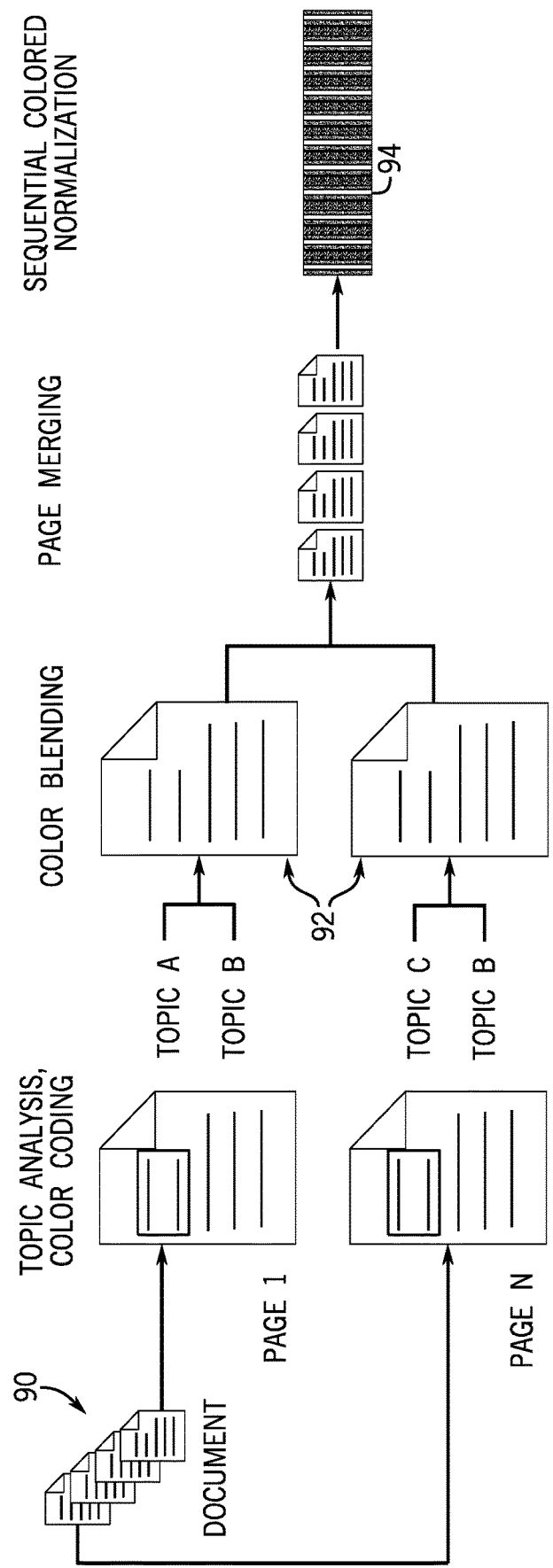
FIG. 6 is a diagram visually depicting an example determination of a document color code for a document, in accordance with embodiments of the present technique.

FIG. 6 is a diagram visually depicting an example determination of a document color code for a document 90. The document 90 is provided as input to the topic classifier 32, which identifies two prevailing topics per page in this example (e.g., topics A and B for page 1, topics C and B for page n), wherein a respective topic color, a relative weighting score, and a respective confidence score is determined for each prevailing topic identified on each page. Using this information, the topic classifier 32 determines topic colors, adjusts the tint of the topic colors, and blends the tinted topic colors proportional to the relative weighting score to determine a respective page color code 92 for each page of the document, as discussed above with respect to FIG. 5. Subsequently, the page color codes 92 of the pages of the document are sequentially combined into a single image representing the document color code 94 of the document. For the illustrated example, the document color code 94 includes a collection of vertical lines representing the pages of the document, wherein each of the vertical lines has a page color code representing a particular page of the document. As such, the document color code 94 provides an information-dense, visual representation of the topics sequentially discussed throughout the pages of the document. Appreciating that documents can widely vary in length, in some embodiments, the width of each of the vertical lines may be normalized relative to the length each document, such that the total width of the document color code 94 is the same, regardless of the length of the document being represented.

Figure 7:
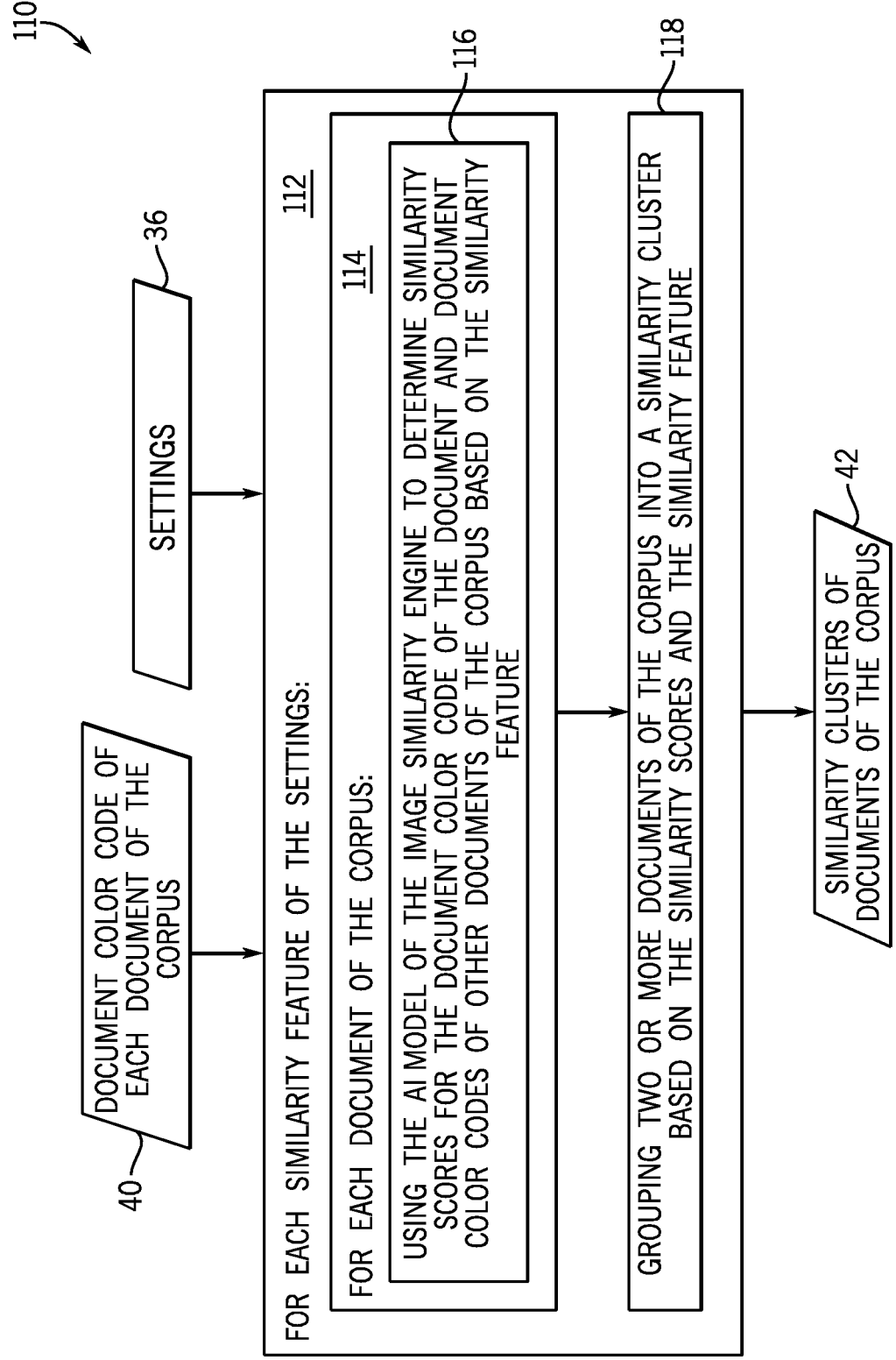
FIG. 7 is a flow diagram illustrating an embodiment of a similarity clustering process whereby an image similarity engine of the DAP system groups the documents of the corpus into similarity clusters, in accordance with embodiments of the present technique.

FIG. 7 is a flow diagram illustrating an embodiment of a similarity clustering process 110 whereby the image similarity engine 34 groups the documents of the corpus 38 into similarity clusters 42. The similarity clustering process 110 may be stored as computer-implemented instructions within the memory 28 and executed by the processor 26 of the DAP server 16, as illustrated in FIG. 1. The similarity clustering process 110 is discussed with reference to elements illustrated in FIG. 1. In some embodiments, the similarity clusters may correspond to particular types of documents that are produced by or as part of an oil and gas exploration, production, or processing operation (e.g., reports, press releases, marketing materials, specification documents, design documents).

For the embodiment illustrated in FIG. 7, the similarity clustering process 110 includes a pair of nested for-loops. The outer for-loop 112 iterates through each similarity feature of a set of similarity features defined and stored in the settings 36 of the DAP server 16, while the inner for-loop 114 iterates through each document of the corpus 38. The similarity features generally define a comparison to be performed between two document color codes to determine a similarity score, and the similarity features may include, but are not limited to: a single topic similarity feature that compares the similarity between two document color codes based on the presence of a particular topic color within the document color codes; a topic volume similarity feature that compares the similarity between two document color codes based on the volume or total contribution of a particular topic color within the document color codes; an organizational similarity feature that compares the similarity between two document color codes based on the order of the page color codes within the document color codes, regardless of volume; an overall similarity feature that compares two documents based on overall similarity (e.g., similar component page color codes in a similar order and at a similar volume). In some embodiments, only the overall similarity feature may be evaluated. As such, the DAP system 10 generally enables document similarity clustering based on one or more similarity features.

For the embodiment illustrated in FIG. 7, within the inner for-loop 114, the similarity clustering process 110 includes the processor 26 using (block 116) the AI model 54 of the image similarity engine 34 to determine similarity scores for the document color code of the current document of the inner for-loop 114 and document color codes of other documents of the corpus 38, based on current similarity feature of the outer for-loop 112. In some embodiments, the document color code of the document may be compared to the respective document color codes of each of the other documents of the corpus 38. As noted above, in some embodiments, the document color code of the document may be compared to the respective document color codes of each of a set of architype document color codes (e.g., stored in the settings 36) that each represent a potential similarity cluster type. As such, the DAP system 10 generally enables document similarity clustering based on technical content and/or document similarity clustering based on comparisons with pre-classified references.

For the embodiment illustrated in FIG. 7, after completing the actions of block 116 for each of the documents of the corpus 38, within the outer for-loop 112, the similarity clustering process 110 includes the processor 26 grouping (block 118) two or more documents of the corpus 38 into a similarity cluster based on the similarity scores and the similarity feature. For example, in some embodiments, the processor 26 may determine (e.g., from the settings 36 of the DAP server 16) a similarity score threshold value for the particular similarity feature, and then group together documents of the corpus 38 having similarity scores greater than or equal to the similarity score threshold for the similarity feature into similarity clusters 42. The similarity clusters 42 determined by the processor 26 may be output or stored in the storage 30 of the DAP server 16, as discussed above.

Figure 8:
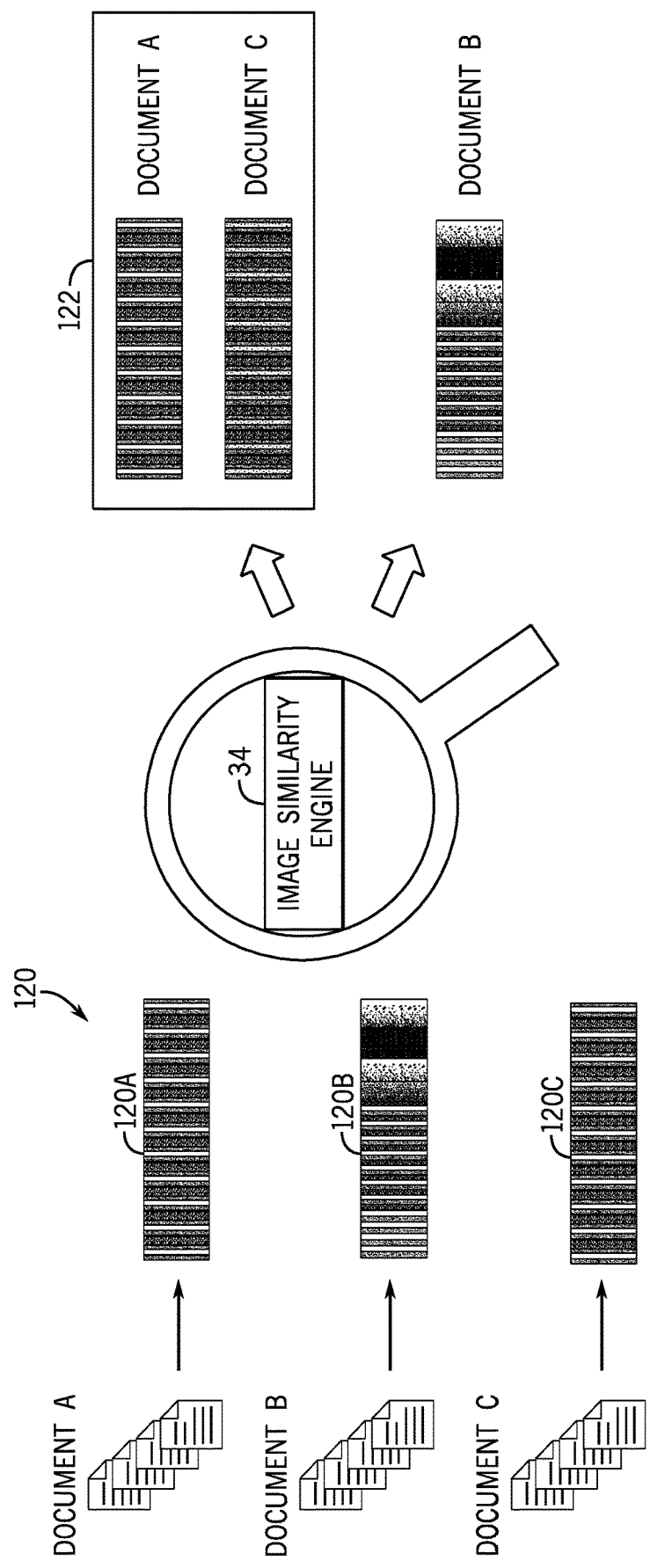
FIG. 8 is a diagram that visually depicts an embodiment of the similarity clustering process of FIG. 7, in accordance with embodiments of the present technique.

FIG. 8 is a diagram that visually depicts an embodiment of the similarity clustering process 110 of FIG. 7. For the embodiment illustrated in FIG. 8, three different documents (e.g., documents A, B, and C) are present in the corpus 38 and have document color codes 120 (e.g., document color codes 120A, 120B, and 120C), determined in accordance with FIG. 2. For the illustrated embodiment, the image similarity engine 34 compares the document color codes 120A, 120B, and 120C based on at least one similarity feature (e.g., an overall similarity feature) to determine similarity scores (not shown). As a result of having sufficiently high similarity scores, the image similarity engine 34 generates a similarity cluster 122, which includes documents A and C. In some embodiments, the document color codes 120, which provide a representation of the document technical content of each document, can be replaced by an embedding vector or a barcode equivalent representation, in accordance with the present disclosure.

Figure 9:
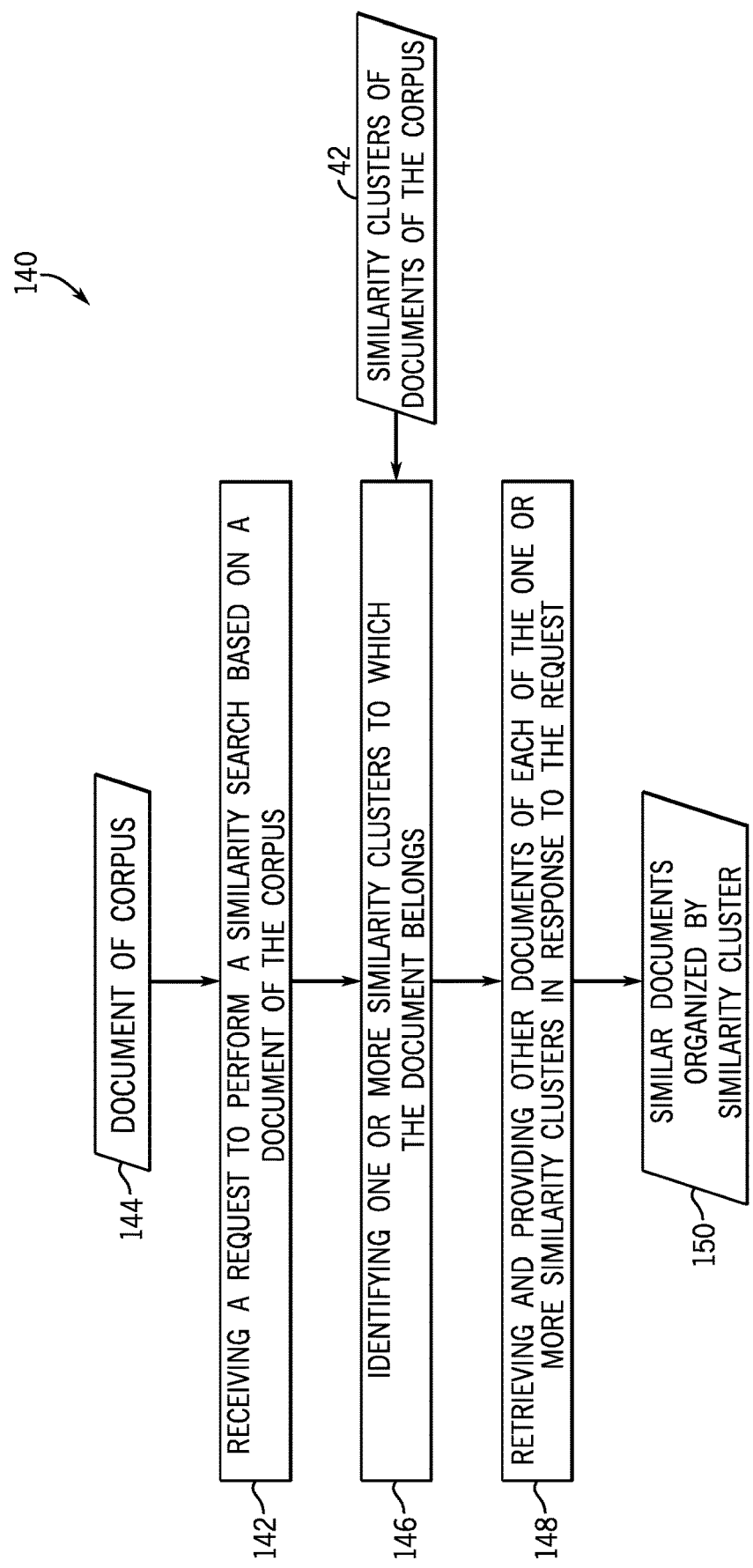
FIG. 9 is a flow diagram illustrating a first embodiment of a similarity search process that can be performed by the DAP server to identify one or more documents of a corpus that are similar to a particular document that is present within the corpus, in accordance with embodiments of the present technique.

FIG. 9 is a flow diagram illustrating an embodiment of a similarity search process 140 that can be performed by the DAP server 16 to identify one or more documents of the corpus 38 that are similar to a particular document that is present within the corpus 38. The similarity search process 140 of FIG. 9 may be stored as computer-implemented instructions within the memory 28 and executed by the processor 26 of the DAP server 16, as illustrated in FIG. 1. The similarity search process 140 of FIG. 9 is discussed with reference to elements illustrated in FIG. 1.

For the embodiment illustrated in FIG. 9, the similarity search process 140 begins with the processor 26 receiving (block 142) a request to perform a similarity search based on a document 144 of the corpus 38. In certain embodiments, the request may include or identify the document 144 of the corpus 38, or the request may include or identify the document color code of the document 144. The processor 26 then identifies (block 146), within the similarity clusters 42 of the documents of the corpus 38 (e.g., in the storage 30 of the DAP server 16), one or more similarity clusters to which the document belongs. The processor 26 then retrieves and provides (block 148) the other documents of the each of the one or more similarity clusters as similar documents 150 in response to the request. In certain embodiments, the similar documents 150 may be organized by similarity cluster.

Figure 10:
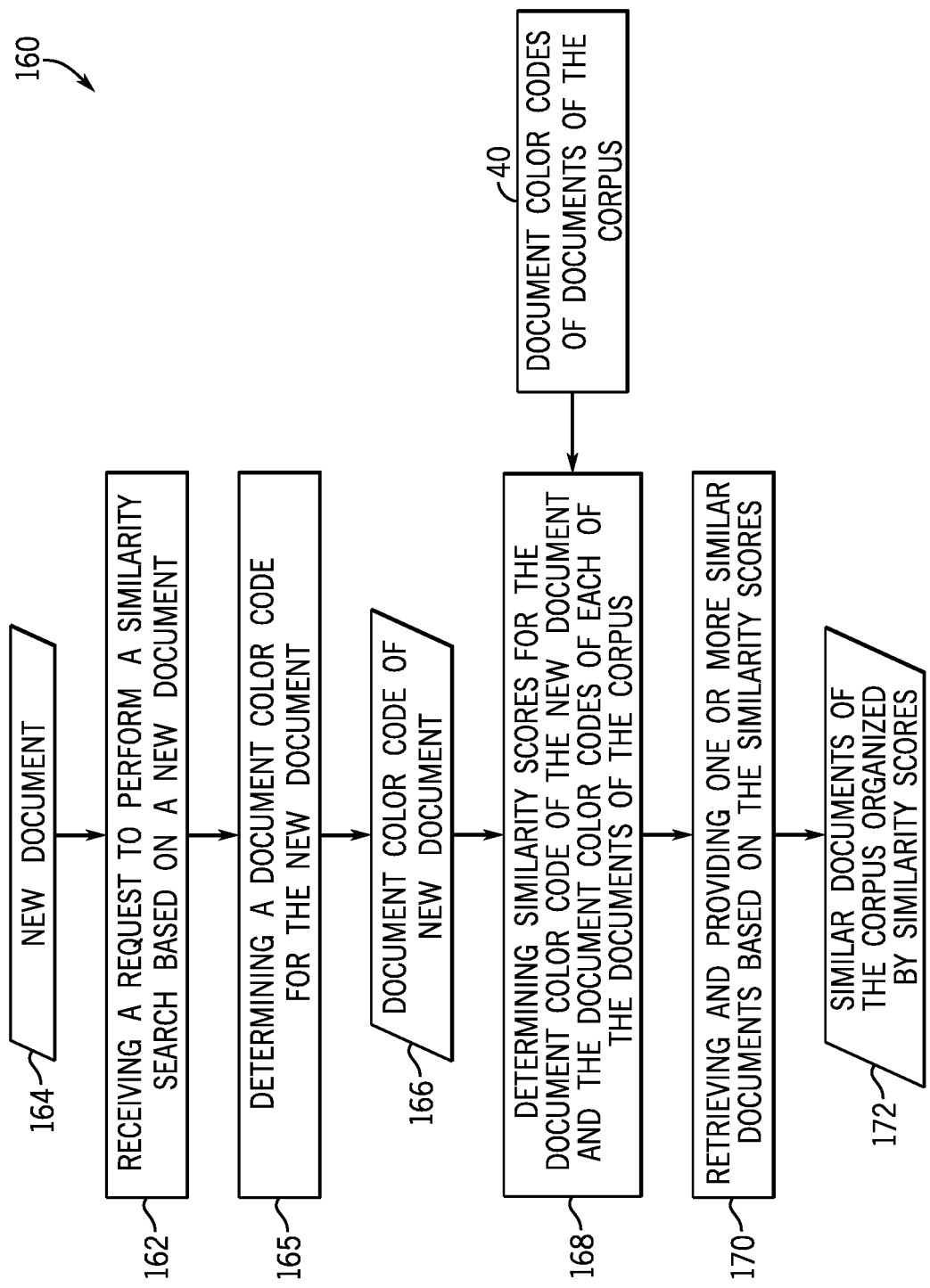
FIG. 10 is a flow diagram illustrating another embodiment of a similarity search process that can be performed by the DAP server to identify one or more documents of a corpus that are similar to a particular document that is not already present within the corpus, in accordance with embodiments of the present technique.

FIG. 10 is a flow diagram illustrating another embodiment of a similarity search process 160 that can be performed by the DAP server 16 to identify one or more documents of the corpus 38 that are similar to a particular document that is not already present within the corpus 38. The similarity search process 160 of FIG. 10 may be stored as computer-implemented instructions within the memory 28 and executed by the processor 26 of the DAP server 16, as illustrated in FIG. 1. The similarity search process 160 of FIG. 10 is discussed with reference to elements illustrated in FIG. 1.

For the embodiment illustrated in FIG. 10, the similarity search process 160 begins with the processor 26 receiving (block 162) a request to perform a similarity search based on a new document 164 that is not present within the corpus 38. In certain embodiments, the request includes the new document 164, and may include other parameters of the search (e.g., a similarity score threshold value). The processor 26 then determines (block 165) a document color code 166 for the new document 164, as discussed above with respect to FIG. 2. The processor 26 then determines similarity scores for the document color code 166 of the new document 164 and the document color codes 40 of documents of the corpus 38 (e.g., from the storage 30 of the DAP server 16).

For the embodiment illustrated in FIG. 10, the similarity search process 160 continues with the processor 26 determining (block 168) similarity scores for the document color code 166 of the new document 164 and the document color codes 40 of each of the documents of the corpus 38. The processor 26 then retrieves and provides (block 170) one or more similar documents 172 from the corpus 38 based on the similarity scores in response to the request. For example, in certain embodiments, the processor 26 may retrieve and provide documents having a similarity score with the new document 164 that exceeds a similarity score threshold value provided as part of the request to initiate the similarity search, or a score threshold value stored in the settings 36 of the DAP server 16. In certain embodiments, the similar documents 172 may be organized by similarity scores.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A document analysis and processing (DAP) system, comprising:
at least one memory configured to store a corpus of documents and a topic classifier having a first trained artificial intelligence (AI) model; and
at least one processor configured to execute stored instructions to perform actions comprising:
for each document of the corpus of documents:
using the first trained AI model of the topic classifier to identify topics of each page of the document;
mapping each of the identified topics of each page of the document to respective topic colors;
combining the respective topic colors of each page of the document to yield a respective page color code for each page of the document; and
combining the respective page color code of each page of the document to yield a respective document color code of the document.

2. The DAP system of claim 1, wherein the corpus of documents is received by the DAP system as input and stored in the at least one memory.

3. The DAP system of claim 1, wherein the respective topic colors comprise orange, violet, green, yellow orange, red orange, red violet, blue violet, blue green, and yellow green.

4. The DAP system of claim 1, wherein using the first trained AI model of the topic classifier to identify topics of each page of the document comprises:
receiving, as input to a neural network model of the first trained AI model of the topic classifier, each page of the document; and
provide, as output of the neural network model of the first trained AI model of the topic classifier, three or less identified topics of each page, a respective relative weighting score for each of the three or less identified topics, and a respective confidence score for each of the three or less identified topics.

5. The DAP system of claim 4, wherein, to combine the respective topic colors of each page of the document, the at least one processor is configured to execute the stored instructions to perform actions comprising:
tinting each of the respective topic colors of the three or less identified topics based on the respective confidence score of each of the three or less identified topics; and
blending together each of the tinted respective topic colors of the three or less identified topics proportional to the respective relative weighting score of each of the three or less identified topics to yield the respective page color code for each page of the document.

6. The DAP system of claim 1, wherein, to combine the respective page color code of each page of the document, the at least one processor is configured to execute the stored instructions to perform actions comprising:
generating an image that contains the respective document color code, wherein the image includes a set of sequentially-ordered vertical colored bars, wherein each of the sequentially-ordered vertical colored bars represents a respective page color code of at least one page of the document.

7. The DAP system of claim 6, wherein, to generate the image, the at least one processor is configured to execute the stored instructions to perform actions comprising:
normalizing a width of the image, such that the respective document color codes of the documents of the corpus have a same width regardless of a number of pages in each document.

8. The DAP system of claim 1, wherein the at least one memory is configured to store an image similarity engine having a second trained AI model, and wherein the at least one processor is configured to execute the stored instructions to perform actions comprising:

using the second trained AI model of the image similarity engine to determine a similarity score for a first document of the corpus and a second document of the corpus based on the respective document color code of the first document and the respective document color code of the second document; and grouping the first document and the second document of the corpus into a similarity cluster based on the similarity score.

9. The DAP system of claim 8, wherein the at least one processor is configured to execute the stored instructions to perform actions comprising:

receiving a request to perform a similarity search based on a particular document of the corpus;

identifying one or more similarity clusters to which the particular document belongs; and retrieving and providing, in response to the request, other documents of the corpus that belong to each of the one or more similarity clusters.

10. The DAP system of claim 1, wherein the at least one processor is configured to execute the stored instructions to perform actions comprising:

receiving a request to perform a similarity search based on a new document that is not part of the corpus of documents;

determining a new document color code for the new document;

determining a respective similarity score for the new document and each document of the corpus based on the new document color code of the new document and the respective document color code of each of the documents of the corpus; and retrieving and providing, in response to the request, one or more of the documents of the corpus based on the respective similarity scores.

11. A method, comprising:

receiving, via a document analysis and processing (DAP) system, a corpus of documents and a topic classifier having a first trained artificial intelligence (AI) model;

for each document of the corpus of documents,
using, via the DAP system, the first trained AI model of the topic classifier to identify topics of each page of the document;
mapping, via the DAP system, each of the identified topics of each page of the document to respective topic colors;
combining, via the DAP system, the respective topic colors of each page of the document to yield a respective page color code for each page of the document; and
combining, via the DAP system, the respective page color code of each page of the document to yield a respective document color code of the document.

12. The method of claim 11, wherein the respective topic colors comprise orange, violet, green, yellow orange, red orange, red violet, blue violet, blue green, and yellow green.

13. The method of claim 11, wherein using, via the DAP system, the first trained AI model of the topic classifier to identify topics of each page of the document comprises:

receiving, as input to a neural network model of the first trained AI model of the topic classifier, each page of the document; and provide, as output of the neural network model of the first trained AI model of the topic classifier, three or less identified topics of each page, a respective relative weighting score for each of the three or less identified topics, and a respective confidence score for each of the three or less identified topics.

14. The method of claim 13, wherein combining the respective topic colors of each page of the document comprises:

tinting, via the DAP system, each of the respective topic colors of the three or less identified topics based on the respective confidence score of each of the three or less identified topics; and blending together, via the DAP system, each of the tinted respective topic colors of the three or less identified topics proportional to the respective relative weighting score of each of the three or less identified topics to yield the respective page color code for each page of the document.

15. The method of claim 11, wherein combining the respective page color code of each page of the document comprises generating, via the DAP system, an image that contains the respective document color code, wherein the image includes a set of sequentially-ordered vertical colored bars, wherein each of the sequentially-ordered vertical colored bars represents a respective page color code of at least one page of the document.

16. The method of claim 15, wherein generating the image comprises normalizing, via the DAP system, a width of the image, such that the respective document color codes of the documents of the corpus have a same width regardless of a number of pages in each document.

17. The method of claim 11, comprising:

receiving, via the DAP system, an image similarity engine having a second trained AI model;

using, via the DAP system, the second trained AI model of the image similarity engine to determine a similarity score for a first document of the corpus and a second document of the corpus based on the respective document color code of the first document and the respective document color code of the second document; and grouping, via the DAP system, the first document and the second document of the corpus into a similarity cluster based on the similarity score.

18. The method of claim 17, comprising:

receiving, via the DAP system, a request to perform a similarity search based on a particular document of the corpus;

identifying, via the DAP system, one or more similarity clusters to which the particular document belongs; and retrieving and providing, via the DAP system, in response to the request, other documents of the corpus that belong to each of the one or more similarity clusters.

19. The method of claim 11, comprising:

receiving, via the DAP system, a request to perform a similarity search based on a new document that is not part of the corpus of documents;

determining, via the DAP system, a new document color code for the new document;

determining, via the DAP system, a respective similarity score for the new document and each document of the corpus based on the new document color code of the new document and the respective document color code of each of the documents of the corpus; and retrieving and providing, via the DAP system, in response to the request, one or more of the documents of the corpus based on the respective similarity scores.

20. A method, comprising:

receiving, via a document analysis and processing (DAP) system, a corpus of documents and a topic classifier having a first trained artificial intelligence (AI) model;

receiving, via the DAP system, an image similarity engine having a second trained AI model;

for each document of the corpus of documents, using, via the DAP system, the first trained AI model of the topic classifier to identify topics of each page of the document;

mapping, via the DAP system, each of the identified topics of each page of the document to respective topic colors;

combining, via the DAP system, the respective topic colors of each page of the document to yield a respective page color code for each page of the document;

combining, via the DAP system, the respective page color code of each page of the document to yield a respective document color code of the document;

using, via the DAP system, the second trained AI model of the image similarity engine to determine a similarity score for a first document of the corpus and a second document of the corpus based on the respective document color code of the first document and the respective document color code of the second document; and grouping, via the DAP system, the first document and the second document of the corpus into a similarity cluster based on the similarity score.

\* \* \* \* \*